United States Patent
Hobrock et al.

(10) Patent No.: US 9,191,691 B2
(45) Date of Patent: Nov. 17, 2015

(54) METHOD AND DEVICE FOR DIAGNOSING INTERFERENCE NOISE PROBLEMS

(75) Inventors: Lance M. Hobrock, Olivenhain, CA (US); Jerry C. Tan, San Diego, CA (US)

(73) Assignee: ARRIS Technology, Inc., Suwanee, GA (US)

( * ) Notice: Subject to any disclaimer, the term of this patent is extended or adjusted under 35 U.S.C. 154(b) by 225 days.

(21) Appl. No.: 13/188,107

(22) Filed: Jul. 21, 2011

(65) Prior Publication Data

US 2013/0021478 A1 Jan. 24, 2013

(51) Int. Cl.
| | |
|---|---|
| *H04B 1/10* | (2006.01) |
| *H04N 21/422* | (2011.01) |
| *G08C 23/04* | (2006.01) |
| *G08C 25/00* | (2006.01) |

(52) U.S. Cl.
CPC ......... *H04N 21/42204* (2013.01); *G08C 23/04* (2013.01); *G08C 25/00* (2013.01)

(58) Field of Classification Search
USPC ............. 455/296, 226.1–226.4, 67.11–67.14, 455/67.7, 63.1–63.4; 348/177, 569, 348/E05.096, E17.005, E05.097, 734, 184
See application file for complete search history.

(56) References Cited

U.S. PATENT DOCUMENTS

| | | | |
|---|---|---|---|
| 6,714,187 B2 | 3/2004 | Nagakubo et al. | |
| 7,167,679 B2 | 1/2007 | Sano | |
| 8,467,685 B2 * | 6/2013 | Eber et al. ..................... | 398/106 |
| 2002/0015112 A1 * | 2/2002 | Nagakubo et al. ............ | 348/734 |
| 2002/0059068 A1 * | 5/2002 | Rose et al. .................... | 704/246 |
| 2003/0005462 A1 | 1/2003 | Broadus et al. | |
| 2005/0132291 A1 | 6/2005 | Wagner | |
| 2005/0190073 A1 | 9/2005 | Berges et al. | |
| 2007/0069918 A1 | 3/2007 | You | |
| 2008/0042596 A1 | 2/2008 | Kanechika | |
| 2009/0045970 A1 | 2/2009 | Miyabayashi et al. | |
| 2009/0109345 A1 * | 4/2009 | Nori ....................... | 348/E05.096 |
| 2009/0245803 A1 | 10/2009 | Garner et al. | |
| 2009/0245804 A1 | 10/2009 | Garner et al. | |
| 2010/0165196 A1 | 7/2010 | Bailey et al. | |
| 2011/0025453 A1 | 2/2011 | Kozlowski | |
| 2011/0244802 A1 * | 10/2011 | Kozlowski et al. ........ | 455/67.13 |

OTHER PUBLICATIONS

EPC Extended Search Report & Written Opinion, RE: Application #12004758.4-2223, Oct. 29, 2012.

* cited by examiner

*Primary Examiner* — Lana N Le
(74) *Attorney, Agent, or Firm* — Stewart M. Wiener

(57) ABSTRACT

A method of diagnosing problems experienced with remote control operation of electronic devices includes monitoring background noise signals with a receiver of a signal processing electronic device, such as a set-top box, for use in receiving and rendering multimedia content via a separate display monitor. The electronic device has an internal remote control unit enabling remote control of the signal processing electronic device via wireless signals emitted from a separate remote controller. The background noise signals are analyzed with a signal processing unit residing in the electronic device. From the analysis, the electronic device generates a representation with respect to the background noise signals. The representation may be provided to the end user, technician or call center operator in a readily understandable form for purposes of readily verifying a noise interference problem and providing guidance with respect to mitigation. A device, such as a set-top box, is also disclosed.

19 Claims, 4 Drawing Sheets

METHOD AND DEVICE FOR DIAGNOSING INTERFERENCE NOISE PROBLEMS

FIELD

A system for diagnosing problems experienced with the operation of a remote control unit, and more particularly, a device and method enabling noise signal interference problems to be verified and resolved.

BACKGROUND

A remote control device, or remote controller, is often used to provide convenient control of operations of a separate electronic device or devices or system of electronic devices from a remote location. For purpose of example, a hand-held, battery-operated remote controller is often used to control operations of televisions, set top boxes (STBs), digital video recorders (DVRs), consumer premises equipment (CPE), and various other home or consumer electronic devices which may be used for receiving, rendering, recording and/or playing audio, video, multimedia content and the like.

In a typical arrangement, a hand-held remote controller transmits a wireless signal, such as an infrared (IR) signal, that includes embedded command codes to a remote control unit (RCU) of one or more electronic devices to be controlled. The infrared signal propagates to the equipment to be controlled and is detected and decoded using an infrared (IR) detector and signal processing circuitry of the RCU. Accordingly, wireless remote control systems provide the convenience of remote operation without the need to directly engage the electronic devices to be controlled and without the need to hard wire the remote controller to the equipment being controlled.

When a problem is experienced with the performance of a remote control operation, there may be many possible sources or reasons for the problem. The source and type of problem are typically difficult for a consumer to identify, verify and resolve. Such problems may even be difficult for trained technicians using specialized equipment to quickly verify and resolve. While some problems may relate to faulty electronic hardware components or software of a remote controller or faulty components or software of the RCU of the electronic device to be controlled or a communication error between the two, a further possible source of the problem may be that the remote control signals are being degraded or blocked by other signals herein defined as interference noise.

In the event of noise above a predetermined acceptable level, the remote control or command signals from the remote controller may not be properly receivable by the signal detector of the RCU of the electronic device to be controlled. Noise interference problems are often very difficult to diagnose, identify, detect and verify by a home user, consumer or other operator of the equipment, particularly because such problems can come and go and change over time for various reasons. Such problems generally lead to user frustration and complaints.

By way of example, the performance of an infrared (IR) remote control system may become blocked or degraded by IR interference noise generated by certain types of television screens, such as certain types of plasma and liquid crystal display (LCD) large-screen back-lit televisions which may be relatively strong sources of infrared radiation. The noise emitted by the TV screen may be of a sufficient level to interfere with IR signals to be received at a set top box (STB), such as a cable TV set top box. Thus, the display monitor or television to which the STB is connected may itself be the source of the noise being received by the STB. If the problem with respect to remote control can be verified to be one caused by interference noise from the television, a possible solution to the problem may be simply a matter of re-positioning the STB relative to the TV screen. However, as stated above, verifying the problem to be a noise interference problem among numerous other possibilities is not a simple task by the end user and proper placement of the STB to mitigate noise interference problems is entirely hit or miss. Thus, verification of such a problem and a proper resolution of such a problem typically require a visit from a trained field service technician using special equipment.

SUMMARY

This disclosure describes a method of diagnosing problems experienced with remote control operation of electronic devices. Background noise signals are detected with a receiver of a signal processing electronic device. The signal processing electronic device may be for use in receiving and rendering multimedia content via a separate display monitor and may have an internal remote control unit enabling remote control of the signal processing electronic device via wireless signals emitted from a separate remote controller. One example of a contemplated embodiment of a signal processing electronic device is a set-top box. The background noise signals are analyzed with a signal processing unit residing in the signal processing electronic device. From this analysis, the signal processing electronic device generates a representation with respect to the background noise signals. This representation may be provided to the end user, technician or call center operator for purposes of readily verifying a noise interference problem and providing guidance with respect to mitigating the problem. The representation of background noise may be provided in a form enabling an end user to be able to readily verify and resolve the problem without the need of an on-site visit by a field service technician.

This disclosure also describes a signal processing electronic device for use in receiving and rendering multimedia content via a display monitor. The signal processing device has a remote control unit with a detector for receiving wireless signals emitted from a separate remote controller and at least one signal processing unit for analyzing the signals received by the detector. At least one of the signal processing units has software for analyzing background noise received by the detector and for generating a representation with respect to the background noise. When provided to the end user, the representation provides guidance with respect to verifying a noise interference problem experienced with remote control operation and providing suggested steps to mitigate such a problem.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Program providers such as multiple system operators, television networks and stations, cable TV operators, satellite TV operators, studios, wireless service providers, and Internet broadcasters/service providers, among others, operate broadband communication systems enabling the delivery of video/audio programs and like multimedia content to consumers over networks or the like via digital or analog signals. In turn, consumer premises equipment (CPE), such as set-top boxes (STBs), media centers, digital video recorders (DVR), personal computers, gaming consoles and other electronic devices are adapted to receive, render, record and playback delivered multimedia content typically via an associated display monitor and/or speakers. For ease of explanation of one such possible embodiment, an arrangement of a relatively simple home entertainment system is shown in FIG. 1.

Figure 1:
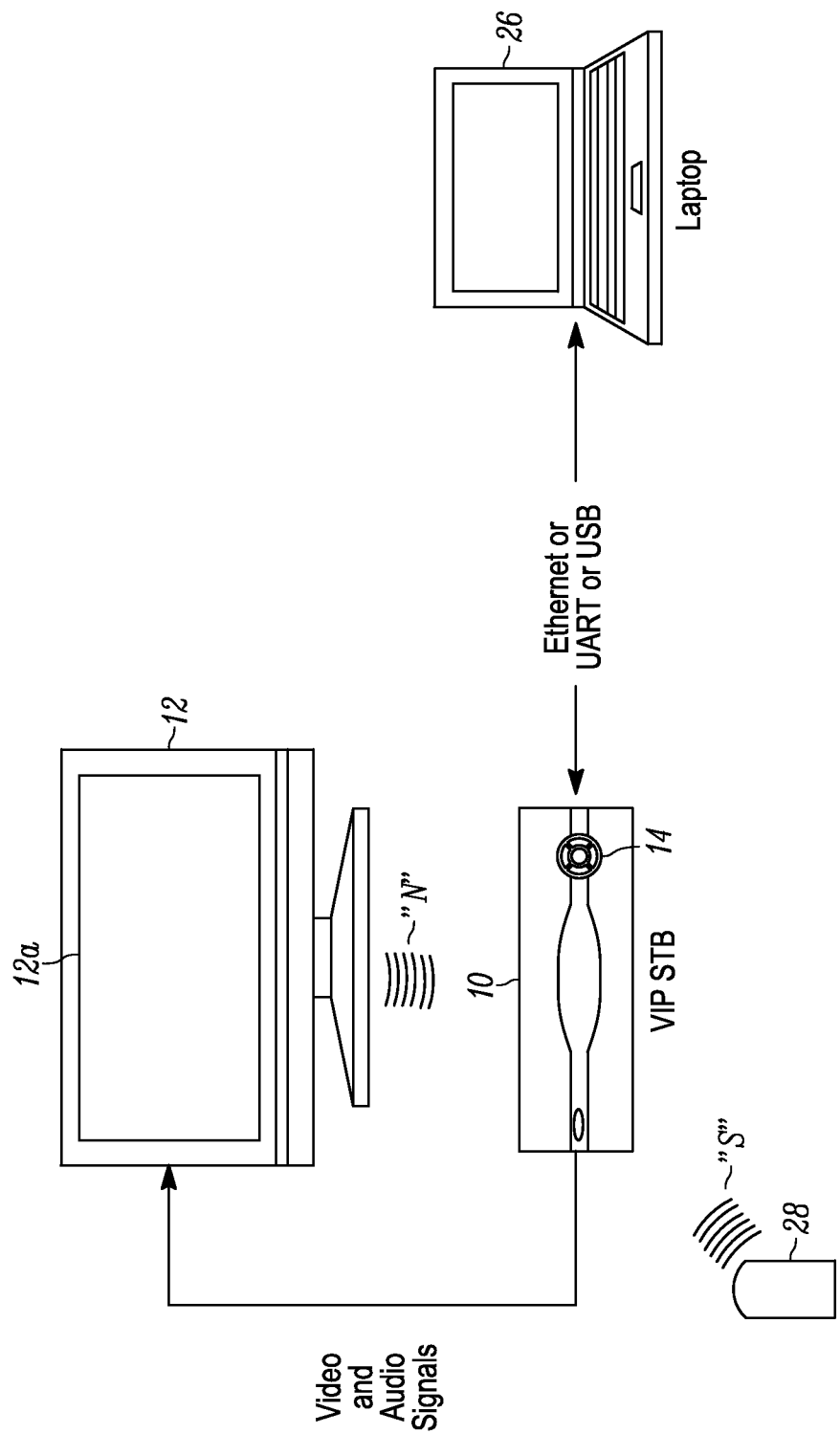
FIG. 1 is an arrangement of one example of a home entertainment system enabling remote control operation.

The STB 10 in FIG. 1 receives and renders delivered multimedia content for display on a separate television 12, which may be a plasma or LCD large screen television that may emit a given amount of radiation. See radiation signals "N" (noise) represented in FIG. 1. The STB 10 may have any type of control panel 14 with buttons or the like provided directly thereon for use by the end user to control operation of the STB 10 and thereby control operation of the television 12 (i.e., tune to a different channel, display a menu screen, display show listings, etc.). In addition, a separate remote controller 28 is typically provided and can be used to control operation of the STB 10, such as via wireless IR signals "S" (see FIG. 1) or the like. Accordingly, a user of the television 12 can remotely send wireless signals "S" to the STB 10 to change the channel or perform any other task permitted. In addition, the STB 10 may also communicate with a computer 26, such as a lap top computer or like consumer device, via a local network, Wi-Fi, or direct cable connection.

Figure 2:
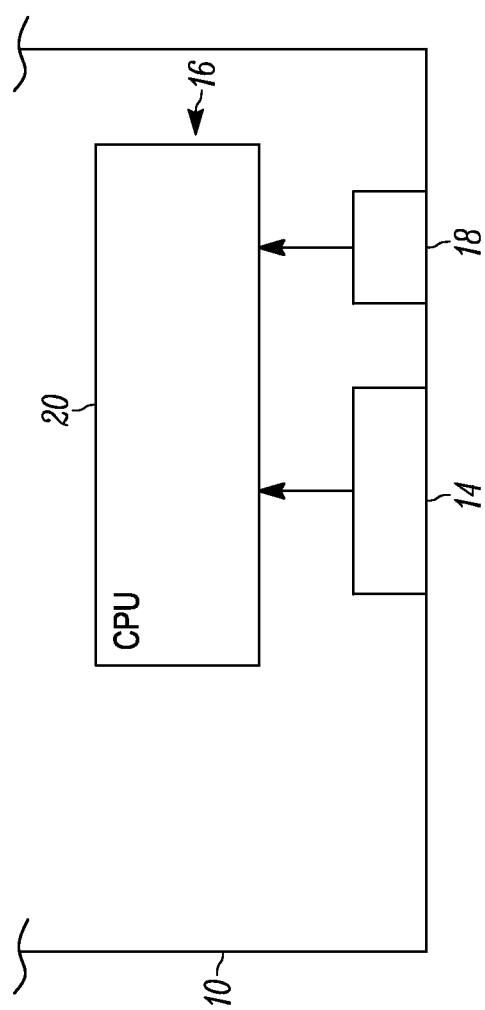
FIG. 2 is a schematic diagram of a signal processing electronic device, such as a STB.

For purposes of enabling remote control, the STB 10 may include remote control unit (RCU) 16 including, for instance, a receiver 18 for detecting command signals transmitted from the remote controller 28 and a central or other processing unit (CPU) 20 for receiving the output of the receiver 18. See FIG. 2. In the present example, the receiver 18 can be an IR detector capable of receiving IR signals, and the CPU (20) processes the received signals and determines the particular command received from the remote controller 28 and causes the STB 10 to execute the command. For instance, the command may cause certain video/audio content to be displayed, recorded, retrieved, played and/or played-back on the television 12.

The STB 10 has noise measurement software code or a software program loaded and running in the CPU 20 or other processing unit. The software is specifically designed with respect to debugging noise interference problems. The IR receiver 18 receives/detects signals from the remote controller 28 and will also necessarily pick up any other IR signals, such as background IR noise including noise "N" from the television 12. The IR receiver 18 does not distinguish commands from noise and outputs any signal received to the CPU 20 for signal analysis. The CPU 20 performs signal analysis to signals detected by for IR receiver 18 and determines if the signal reflects a proper command signal from the remote controller 28 or if the received signal is noise, such as radiation "N" from the television 12. If the CPU 20 identifies the signal as noise, the noise measurement software measures and calculates background IR noise strength and may also determine whether or not performance of the remote control system may or may not be expected to be degraded due to the existence of the background noise.

The CPU 20 and/or noise measurement software of the STB 10 converts the raw data of the background noise received by the IR receiver 18 in a form, hereinafter referred to as a representation, for being presented directly to the end user, a customer service representative, or to a technician of the service provider. As one example, the CPU 20 and/or noise measurement software residing in the STB 10 may provide a visual indication of the level or intensity of background IR noise or the likelihood of a noise problem to the end user via the display screen or monitor 12a of the television 12. In this case, an easily understandable visual representation or display is shown on the screen 12a of the television 12 thereby providing a simple means of informing the end user or a field service technician of whether the source of a remote control operation problem is the result of interference noise or whether there is no noise problem.

Figure 4:
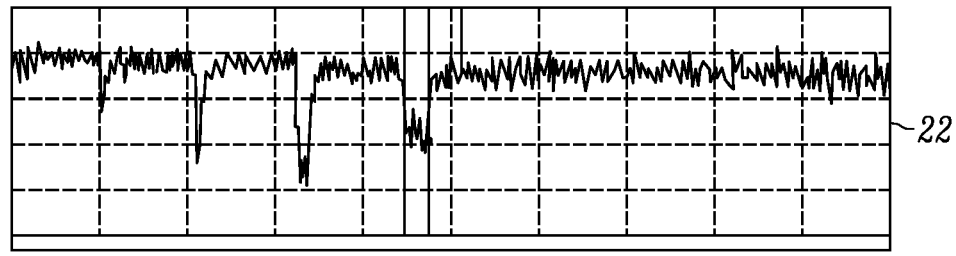
FIG. 4 illustrates a first embodiment of a visual representation for providing guidance with respect to a noise interference problem.

In one contemplated embodiment, the CPU 20 and/or noise measurement software of the STB 10 uses the television 12 as a so-called "virtual oscilloscope". Thus, the very display screen 12a that may be the source of the IR interference noise problem is used as means for displaying the results of an interference noise analysis performed by the STB 10. For instance, the visual representation or display could appear similar to what an engineer will typically see on the screen of a conventional oscilloscope, i.e., a waveform signal 22 having a picket fence like appearance. See FIG. 4.

Figure 5:
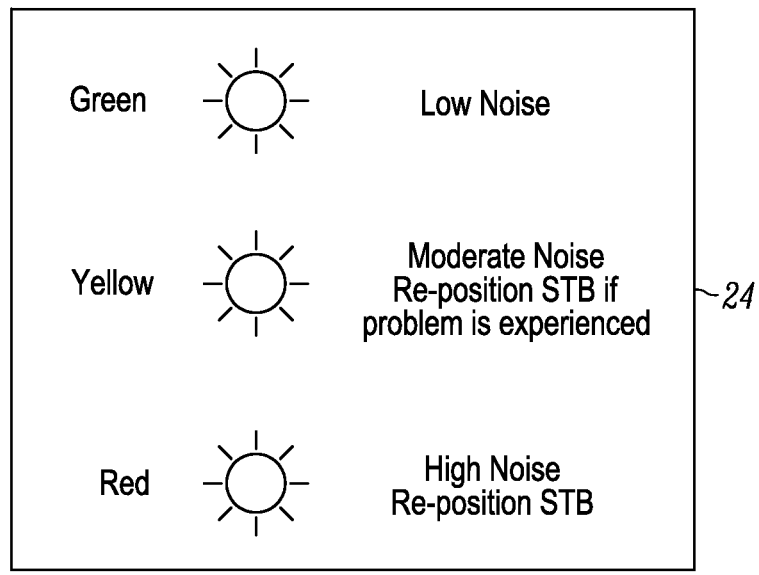
FIG. 5 illustrates a second embodiment of a visual representation for providing guidance with respect to a noise interference problem.

As an alternate embodiment, the visual representation or display produced by the STB 10 may be simplified in a visual form using a so-called "stoplight" approach in which red, yellow and green lights 24 may be shown and with an appropriate one illuminated indicating the level of noise and the likelihood as being the source of a problem. See FIG. 5. Yet a further example may be an audible representation using a so-called "sonar" approach which may include beeps that rise and fall in pitch and/or volume to indicate the level of interference. Of course, the audible representation can be provide in plain speech, i.e., "acceptable level of noise" or "level of noise too high", and the representation can include both a visual display and audible sounds.

Numerous other visual and audible means for informing the end user or service technician of the presence or absence and strength of interference noise are possible. For instance, the display could be in the form of a simple indication of an "acceptable" or "non-acceptable" level of background IR noise or could use bar graphs, visual images of gauges, or simple word descriptions provided in written language as possible alternatives for providing a user-friendly display format that is easy to understand without the requirement of special training.

In this manner, an indication of expected RCU 16 operation while experiencing a current measured level of IR noise can be provided to the end user or service technician. The representation or display provided on television 12 via STB 10 may also include simple instructions for the end user, such as instructing the end user to reorient or re-position the STB 10 further away from the noise source, such as TV 12, until measurements showing improvement of noise levels to below a predetermined acceptable threshold are reached.

In the above representations, the television 12 can be used to simultaneously display representations of background IR noise as well as any remote control IR signal received by the STB 10. Thus, the strength of the noise relative to the strength of the command signals can be indicated to the end user or service technician. In addition, the analysis and display of background IR noise can be accomplished in real-time or with expected delays. For purposes of this disclosure, "real-time" includes a level of responsiveness that is sufficiently fast, for instance, to substantially keep up with the stream of signals being received by IR receiver 18 as well as a level of responsiveness that tolerates a degree of lateness or built-in delay. The display generated by the STB 10 with respect to representing the noise and strength thereof to the consumer or technician can be provided as standard signals, such as NTSC Composite, HDMI or others.

As an alternative with respect to displaying the interference noise information on the television 12, the STB 10 can be programmed to send a signal to another customer premises device for display, such as lap top computer 26 shown in FIG. 1. For instance, the STB 10 can forward a video signal for display on a lap top computer 26 which may be interconnected to the STB 10 via Ethernet, Wi-Fi, UART or USB for viewing the representation at the consumer's premises. As another alternative, the STB 10 can be programmed to transmit the analysis of the noise interference in an upstream path on the provider's network to a customer service center or the like where trained technicians can review the results. The above information may be transmitted automatically or upon the command of the user, a service technician, or a service call center operator.

The above referenced software or module for performing the above function with respect to monitoring, measuring and preparing information for display with respect to IR interference noise may reside in the STB 10. It may be loaded into the STB 10 as manufactured, or the software may be downloaded by the STB 10 via a computer or memory connected to or communicating with the STB 10 or via the service provider's network. Thus, the software can be loaded into STBs in the field and the software can be readily updated as needed.

Use of the noise interference monitoring software residing within the STB 10 provides a convenient and user-friendly noise interference problem debugging tool that can be used directly by the end user or by a call center operator without need for a service technician to visit the home or location. In addition, the use of the IR receiver 18 of the STB 10 to perform the monitoring and measurement of noise ensures that there is no discrepancy in the measurement between the IR interference noise actually experienced by the STB 10 and in the test as would be possible if separate equipment of a field service technician with its own IR detector was used to take the measurement.

Figure 3:
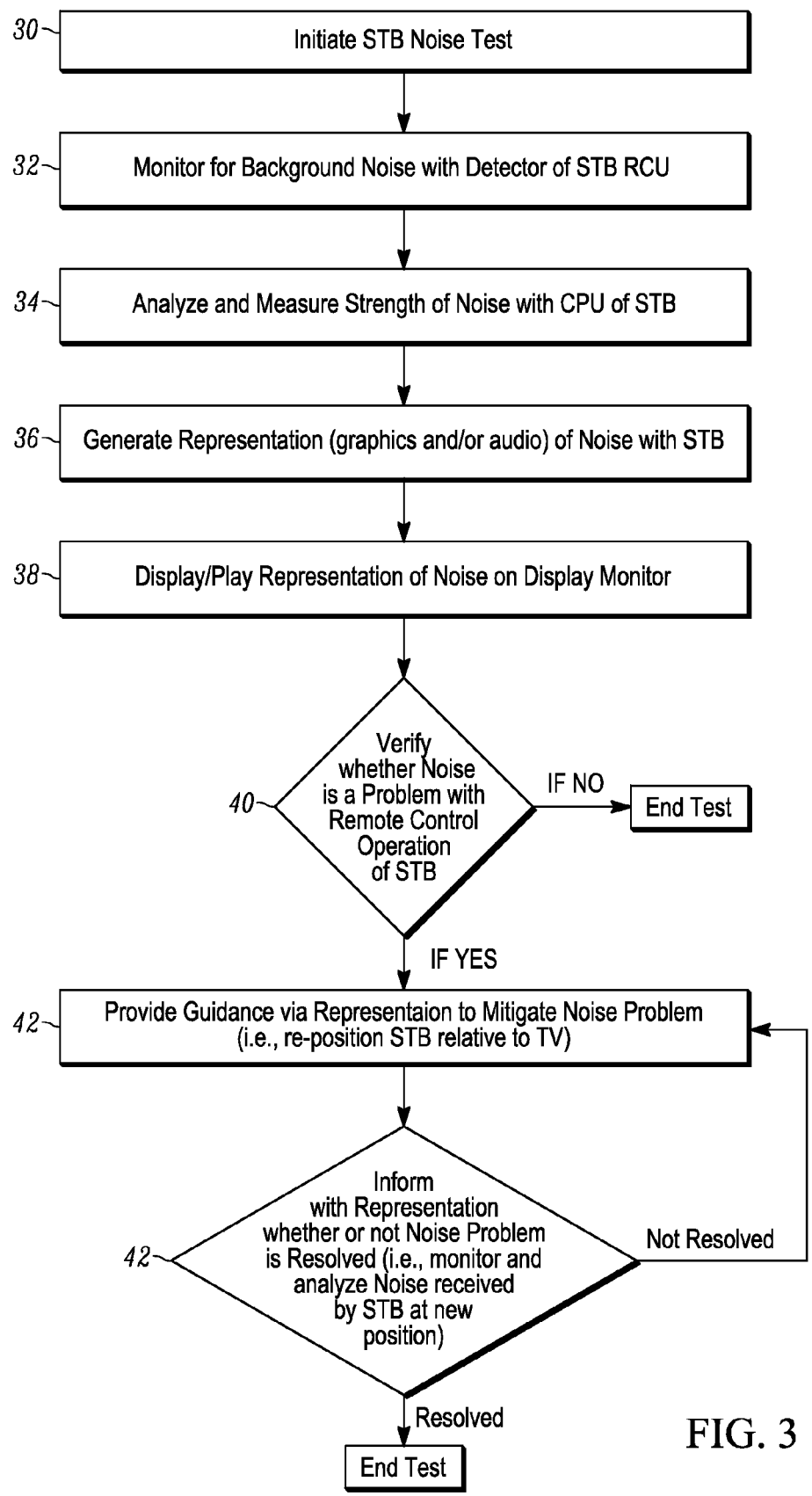
FIG. 3 is a flowchart that illustrates a process steps for diagnosing a noise interference problem.

The test with respect to interference noise can be initiated at any time. See step 30 in FIG. 3. For example, the test can be initiated by the end user using control buttons provided directly on the STB 10. Alternatively, the STB 10 may automatically perform the test, for instance, at pre-set periodic intervals, continually in the background, when a motion sensor within the STB 10 is actuated by motion of the STB 10, or when the receiver 18 detects a pre-set level of noise. Thus, if the STB 10 determines that the interference noise detected may be sufficiently high to cause degradation of the remote control system, the STB 10 may automatically inform the end user via a representation or display on the television 12 or may send such information to a service call center of the service provider so that the a call center operator may convey such information to the end user. Yet other alternatives for initiating a test of interference noise include commands sent remotely via the service provider's call center operator or locally by a field service technician called out to diagnosis the problem.

As part of the test, the receiver 18 of the STB 10 monitors and detects signals including noise (see step 32) and analyzes the signals to measure the strength of the noise (see step 34). The CPU 20 of the STB 10 then generates a representation of the strength of the noise and whether or not such noise will impact normal remote control operations (see step 36). The results of the test may be displayed or played on the television 12, another device at the customer's premise, such as a lap top computer 26 or the like, or remotely at a service call center. See step 38.

Based on the representation, it can be determined and verified by the end user or the like whether or not an interference noise problem is the source of the failure of proper remote control operation, or if noise interference levels are not creating a problem. See step 40. If a noise interference problem is identified and verified, the STB 10 may automatically cause instructions to be displayed on television 12 with respect to providing guidance for mitigating the noise interference problem. See step 42. For instance, the STB 10 may display a set of instructions on the television 12 for the end user to move or re-position the STB 10 relative to the TV 12. Interference noise can be measured for this new positioning of the STB 10 and the results can be visually displayed on the television 12 or audible provided by beeps or the like as discussed above in the so-called "sonar" approach. The display and/or emitted audio can be used to inform the end user that the new position is acceptable and that interference noise is within levels not expected to cause a problem or that the new position is not acceptable because interference noise levels are still too high. See step 44. Through trial and error and by viewing the results reported directly on the television 12 or by listening to beeps or the like, a new location which is acceptable can be readily obtained. Such a process may not require the need for a field service technician to perform the test or placement of the STB 10.

The devices, units, modules and storage discussed above can physically be provided on a circuit board or within an electronic device and can include various processors, microprocessors, controllers, chips, disk drives, and the like. It will be apparent to one of ordinary skill in the art that the modules, processors, controllers, units and the like may be implemented as electronic components, software, hardware or a combination of hardware and software. In addition, although the examples above are directed to a home entertainment system and use of IR remote control signals, the procedure and devices are not limited to such examples. The devices and systems can be any equipment in which wireless control signals are required to be received for a device for purposes of controlling operation of one or more devices. The signals can be IR or any other form of signal subject to interference from noise. The source of the noise is not limited to televisions and can be any type of radiation emitting device or the like.

While the principles of the invention have been described above in connection with specific devices, systems, and methods, it is to be clearly understood that this description is made only by way of example and not as limitation on the scope of the invention as defined in the appended claims.

We claim:

1. A method of diagnosing problems experienced with remote control operation of electronic devices, comprising the steps of:
monitoring background noise signals with a receiver of a signal processing electronic device, the signal processing electronic device being for use in receiving and rendering multimedia content via a display monitor and having an internal remote control unit enabling remote control of the signal processing electronic device via wireless signals emitted from a separate external remote controller;
analyzing the background noise signals received by the receiver with a signal processing unit residing internally within the signal processing electronic device;
generating with the signal processing electronic device a representation comprising a visual indication of a level or intensity of the background noise signals; and
transmitting the representation over a network for display at a remote location of a service provider.

2. The method according to claim 1, wherein the representation provides verification as to whether or not the background noise signals to which the receiver of the signal processing electronic device is subject is a source of a problem being experienced with remote control operation.

3. The method according to claim 1, wherein the receiver used in said monitoring step is a detector of the internal remote control unit used for receiving wireless remote control command signals from the remote controller.

4. The method according to claim 3, wherein the detector is an infrared (IR) detector for receiving wireless IR signals from the remote controller.

5. The method according to claim 1, wherein the representation generated by the signal processing electronic device is a visual representation.

6. The method according to claim 5, further comprising the step of displaying the visual representation on the display monitor.

7. The method according to claim 6, wherein the signal processing electronic device is a set-top box and the display monitor is separate from the set-top box and is selected from the group consisting of a television and a display screen of a computer.

8. The method according to claim 5, wherein the visual representation is in the form selected from the group consisting of a waveform pattern, words, graphs, and images.

9. The method according to claim 1, wherein the representation is an audible representation using sounds to indicate a level of interference noise being detected by the signal processing electronic device.

10. The method according to claim 1, wherein, when the signal processing electronic device is re-positioned, the representation provides information with respect to an increase or decrease in a strength of the background noise signals to which the receiver of the signal processing electronic device is subject as re-positioned.

11. The method according to claim 1, wherein said steps of monitoring and analyzing background noise signals are accomplished substantially in real-time so that an effect of re-positioning the signal processing electronic device in an effort to reduce strength of background noise signals received by the receiver can be accomplished in with a level of responsiveness that is sufficiently fast to substantially keep up with a stream of signals being received by the receiver.

12. The method according to claim 1, wherein the signal processing electronic device is selected from the group consisting of consumer premises equipment, a set-top box, a personal computer, a desktop computer, a laptop computer, a pad or tablet computer, a media player, a gaming console, and a smart phone, and wherein the display monitor is selected from the group consisting of a television and a display screen of a computer.

13. A signal processing electronic device for use in receiving and rendering multimedia content via a display monitor, comprising:
a remote control unit having a detector for receiving wireless signals emitted from a separate remote controller and at least one signal processing unit for analyzing the wireless signals received by the detector;
at least one of said at least one signal processing units having software for analyzing background noise received by said detector and for generating a representation comprising a visual indication of a level or intensity with respect to the background noise and transmitting the representation over a network for display at a remote location of a service provider, wherein the representation comprises information relating to mitigation of an interference problem associated with remote control operation.

14. The signal processing electronic device according to claim 13, wherein the representation provides verification as to whether or not background noise to which the detector of the signal processing electronic device is subject is a source of a problem being experienced with remote control operation.

15. The signal processing electronic device according to claim 13, wherein the signal processing electronic device is a set-top box, and wherein the detector is an infrared (IR) detector.

16. The signal processing electronic device according to claim 13, wherein the representation generated by the signal processing electronic device is a visual representation in a form selected from the group consisting of a waveform pattern, words, graphs, and images for display on a separate display monitor to which the signal processing electronic device is connected.

17. The signal processing electronic device according to claim 13, wherein the representation is an audible representation using sounds to indicate a level of interference noise being detected by the signal processing electronic device.

18. The signal processing electronic device according to claim 13, wherein, when the signal processing electronic device is re-positioned, the representation provides information with respect to an increase or decrease in a strength of the background noise to which the detector of the signal processing electronic device is subject as re-positioned.

19. The signal processing electronic device according to claim 13, wherein the signal processing electronic device is selected from the group consisting of consumer premises equipment, a set-top box, a personal computer, a desktop computer, a laptop computer, a pad or tablet computer, a media player, a gaming console, and a smart phone.

* * * * *